United States Patent
Kang et al.

(10) Patent No.: US 11,751,115 B2
(45) Date of Patent: Sep. 5, 2023

(54) HIERARCHICAL POLICY LEARNING FOR HYBRID COMMUNICATION LOAD BALANCING

(71) Applicant: SAMSUNG ELECTRONICS CO., LTD., Suwon-si (KR)

(72) Inventors: Jikun Kang, Montreal (CA); Xi Chen, Montreal (CA); Di Wu, Montreal (CA); Yi Tian Xu, Montreal (CA); Xue Liu, Montreal (CA); Gregory Lewis Dudek, Westmount (CA); Taeseop Lee, Seoul (KR); Intaik Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 107 days.

(21) Appl. No.: 17/363,918

(22) Filed: Jun. 30, 2021

(65) Prior Publication Data

US 2022/0150786 A1 May 12, 2022

Related U.S. Application Data

(60) Provisional application No. 63/110,515, filed on Nov. 6, 2020.

(51) Int. Cl.
*H04W 36/22* (2009.01)
*G06N 3/08* (2023.01)
(Continued)

(52) U.S. Cl.
CPC ............ *H04W 36/22* (2013.01); *G06N 3/044* (2023.01); *G06N 3/08* (2013.01); *H04W 24/02* (2013.01); *H04W 28/0861* (2023.05)

(58) Field of Classification Search
CPC . H04W 36/22; H04W 24/02; H04W 28/0808; G06N 3/044; G06N 3/08; G06N 3/006; G06N 3/088; Y02D 30/70
See application file for complete search history.

(56) References Cited

U.S. PATENT DOCUMENTS 9,813,942 B2 11/2017 Jang
9,843,963 B2 12/2017 Xiao et al.
(Continued)

FOREIGN PATENT DOCUMENTS

| CN | 103220694 B | 8/2016 |
| KR | 1020120059751 A | 6/2012 |
| KR | 10-1966911 B1 | 4/2019 |

OTHER PUBLICATIONS

International Search Report issued for PCT Application No. PCT/KR2021/015939 dated Feb. 8, 2022.
(Continued)

*Primary Examiner* — Jae Y Lee
(74) *Attorney, Agent, or Firm* — Sughrue Mion, PLLC

(57) ABSTRACT

Hybrid use of dual policies is provided to improve a communication system. In a multiple access scenario, when an inactive user equipment (UE) transitions to an active state, it may be become a burden to a radio cell on which it was previously camping. In some embodiments, hybrid load balancing is provided using a hierarchical machine learning paradigm based on reinforcement learning in which an LSTM generates a goal for one policy influencing cell reselection so that another policy influencing handover over active UEs can be assisted. The communication system as influenced by the policies is modeled as a Markov decision process (MDP). The policies controlling the active UEs and inactive UEs are coupled, and measureable system characteristics are improved. In some embodiments, policy actions depend at least in part on energy saving.

20 Claims, 11 Drawing Sheets

(51) Int. Cl.
    *H04W 24/02*  (2009.01)
    *G06N 3/044*  (2023.01)
    *H04W 28/086*  (2023.01)

(56) References Cited

U.S. PATENT DOCUMENTS

| | | | |
|---|---|---|---|
| 9,986,440 | B2 | 5/2018 | Guvenc |
| 10,841,853 | B1 | 11/2020 | Yousefi'zadeh et al. |
| 2005/0176440 | A1 | 8/2005 | Sang et al. |
| 2013/0021962 | A1 | 1/2013 | Hu et al. |
| 2016/0165469 | A1* | 6/2016 | Gopalakrishnan .... H04W 16/28 455/67.11 |
| 2017/0118678 | A1 | 4/2017 | Brisebois |
| 2018/0165603 | A1* | 6/2018 | Van Seijen ............ G06N 3/084 |
| 2019/0319868 | A1 | 10/2019 | Svennebring et al. |
| 2021/0187733 | A1* | 6/2021 | Lee ........................ G06N 20/00 |
| 2022/0014963 | A1* | 1/2022 | Yeh ........................ G06N 3/045 |
| 2022/0055689 | A1* | 2/2022 | Mandlekar ............ B60W 30/06 |
| 2022/0295324 | A1* | 9/2022 | Pantelidou ............ H04W 24/08 |
| 2023/0007721 | A1* | 1/2023 | Chun .................... H04W 76/19 |

OTHER PUBLICATIONS

Written Opinion issued for PCT Application No. PCT/KR2021/015939 dated Feb. 8, 2022.

* cited by examiner

Procedure 1 Hierarchical Policy Learning Procedure

1: Randomly initiate $a_0$ and $g_0$.
2: for every time step $t$ ($t = 1, 2, ...$) do
3:     Apply action $a_{t-1}$ to the environment.
4:     Collect the current state $S_t$ and the reward $r_{t-1}$ from the environment.
5:     Calculate the rewards of both levels, i.e.,
$$r_{t-1}^L = R(g_{t-1}, S_t) \text{ and } r_{t-1}^H = r_{t-1}.$$
6:     Compute the advantage functions $Q_{\mu L}$ and $Q_{\mu H}$.
7:     Update the parameters of the lower-level policy $\mu_L$ by minimizing the loss presented in Eqn. (11).
8:     Update the parameters of the higher-level policy $\mu_H$ by minimizing the loss presented in Eqn. (12).
9:     Update the LSTM model $f_{LSTM}$ of the subgoal generator by minimizing the loss presented in Eqn. (13).
10:     Generate a higher-level action $a_t^H$ with policy $\mu_H(S_t)$.
11:     Use the subgoal generator to produce a new subgoal $g_t = f_{LSTM}(S_t, a_t^H)$.
12:     Generate a lower-level action $a_t^L$ with policy $\mu_L(S_t, g_t)$.
13:     Concatenate actions from both levels to generate the united action $a_t = a_t^H \oplus a_t^L$.
14: end for

FIG. 6B

HIERARCHICAL POLICY LEARNING FOR HYBRID COMMUNICATION LOAD BALANCING

CROSS REFERENCE TO RELATED APPLICATION

This application claims benefit of priority of U.S. Provisional Application No. 63/110,515 filed Nov. 6, 2020, the contents of which are hereby incorporated by reference.

FIELD

The present disclosure is related to improving load balancing in a communication system using artificial intelligence (AI).

BACKGROUND

The present application relates to load balancing of a communication system. In a communication system, there are idle-mode user equipments (UEs) and active-mode UEs. The communication system may experience imbalanced load across cells of the communication system. The imbalanced load causes some cells to have too many users while other cells are lightly loaded. Users in the heavily-loaded cells may experience delays, low throughput or high error rates. Also, the system operator may wish to make use of a higher fraction of system bandwidth for user payload data rather than for signaling related to cell reselection and/or signaling related to handover.

Because there are both idle mode users and active mode users, the problem is complex. For example, after shifting an idle mode user to a second cell, the idle mode user may become an active mode user more advantageously associated with a cell other than the second cell. Causing a handover in this situation increases system bandwidth devoted to signaling and may be perceptible to the user.

SUMMARY

A problem exists in radio resource allocation for multiple access. In the multiple access scenario, some user equipments (UEs) are actively transmitting/receiving in a communication system (e.g., radio network) and some other UEs are associated with the communication system, but the other UEs are not actively transmitting/receiving. When an inactive UE transitions to an active state, it may be become a burden to the radio cell on which it was previously camping. Also, due to the problem, a user of the communication system experiences delays, low throughput and/or high error rate. This problem can be reduced by shifting some idle mode users to other cells and influencing some handovers of active mode users.

A second problem exists in electrical power consumption of base stations. Sometime a base station is operating, consuming electrical power, and the base station does not need to be operating.

The solution uses a machine learning paradigm called reinforcement learning. Reinforcement learning models a system as a Markov decision process (MDP) which includes actions and rewards as a system changes from one state to another state. A policy chooses actions to increase accumulation of rewards over a sequence of actions.

The solution adjusts the association of inactive UEs with radio cells and the association of active UEs with the radio cells by forming a lower policy for the inactive UEs and a higher policy for the active UEs.

For the electrical power problem, the lower policy is directed to deciding whether to turn off an aspect of a base station. For example, an action of the lower policy may turn off a radio device of a particular base station.

In application, the higher policy is used to select a second action affecting the active UEs. The solution then sets a goal based on the second action. A first action is chosen based on the modified lower policy. Thus, the policies controlling the active UEs and inactive UEs are coupled, and measureable system characteristics are improved. Examples of measureable system characteristics are standard deviation of throughput (fairness), average throughput of the system (single number characterizing system performance), and moderation of handover rate (single number related to handover overhead).

A summary of one embodiment uses the following flow: determining a system set of parameters; updating a higher policy based on the system set of parameters and higher loss; selecting a higher action based on the higher policy; selecting a goal for the lower policy based on the system set of parameters and the higher action; updating a lower policy based on the system set of parameters, goal, and lower loss; selecting a lower action based on the goal and lower policy; and applying a united action to the communication system. The united action is based on the lower action and the higher action.

Provided herein is a server method by a server for a hierarchical dual reinforcement learning process for better balanced network traffic in a communication system, wherein the communication system includes a first base station and a second base station, the server method comprising: updating a higher policy based on a system set of parameters and a second loss to improve a higher-level reward at a first time; selecting a second action based on the higher policy; selecting a goal for a lower policy based on the system set of parameters and based on the second action; updating the lower policy based on the system set of parameters and based on a first loss to improve a lower-level reward at the first time; selecting a first action based on the goal and based on the first loss; and applying a united action to the communication system, wherein the united action is based on the first action and the second action.

In some embodiments, the united action comprises the server configuring the first base station and the server configuring the second base station.

In some embodiments, the second action is associated with active UE load balancing (AULB) and the first action is associated with inactive UE load balancing (IULB).

In some embodiments, the updating the lower policy is a form of lower policy learning and the updating the higher policy is a form of higher policy learning.

In some embodiments, the system set of parameters includes: a first state of a first cell of the communication system, and a first reward associated with the first cell, wherein the first base station supports the first cell.

In some embodiments, the first state of the first cell is a first cell vector including at least three elements, a first element of the first cell vector is an average number of UEs in the first cell, a second element of the first cell vector is an average bandwidth utilization of the first cell, and a third element of the first cell vector is an average throughput of the first cell, and wherein the server method further comprises determining the system set of parameters by receiving the first cell vector, receiving a second cell vector.

In some embodiments, the lower policy is configured to identify lower-level actions associated with cell reselection at the first base station and at the second base station, and the higher policy is configured to identify higher-level actions associated with handover between the first base station and the second base station.

In some embodiments, the lower-level actions include a first lower-level action of a first cell re-selection from a first cell to a second cell, and a second lower-level action of a second cell re-selection from the second cell to the first cell, and the higher-level actions include a first higher-level action of a first handover from the first cell to the second cell, and a second higher-level action of a second handover from the second cell to the first cell.

In some embodiments, the first lower-level action is a first pair of thresholds, first beta and first alpha, and the first higher-level action is a first single threshold, first alpha, and the second lower-level action is a second pair of thresholds, second beta and second alpha, and the second higher-level action is a second single threshold, second alpha.

In some embodiments, the selecting the united action is configured to improve a standard deviation of a throughput indicating fairness of the communication system, improve an average throughput of the communication system, and/or smooth ping-pong effects to moderate a number of handovers per cell per unit time.

Also provided herein is a server comprising one or more processors and one or more memories, the one or more memories configured to hold instructions, wherein execution of the instructions by the one or more processors causes the server to perform: update a higher policy based on a system set of parameters and a second loss to improve a higher-level reward at a first time; select a second action based on the higher policy; select a goal for a lower policy based on the system set of parameters and based on the second action; update the lower policy based on the system set of parameters and based on a first loss to improve a lower-level reward at the first time; select a first action based on the goal and based on the first loss; and apply a united action to a communication system, wherein the united action is based on the first action and the second action.

Also provided herein is a non-transitory computer readable medium configured to hold instructions, wherein execution of the instructions is configured to cause a server to: update a higher policy based on a system set of parameters and a second loss to improve a higher-level reward at a first time; select a second action based on the higher policy; select a goal for a lower policy based on the system set of parameters and based on the second action; update the lower policy based on the system set of parameters and based on a first loss to improve a lower-level reward at the first time; select a first action based on the goal and based on the first loss; and apply a united action to a communication system, wherein the united action is based on the first action and the second action.

BRIEF DESCRIPTION OF THE DRAWINGS

The text and figures are provided solely as examples to aid the reader in understanding the invention. They are not intended and are not to be construed as limiting the scope of this invention in any manner. Although certain embodiments and examples have been provided, it will be apparent to those skilled in the art based on the disclosures herein that changes in the embodiments and examples shown may be made without departing from the scope of embodiments provided herein.

Similar to FIG. 1B.

FIG. 6B illustrates exemplary pseudo-code 6-11, a more specific example of logic flow 2-8, according to some embodiments.

DETAILED DESCRIPTION

Figure 1A:
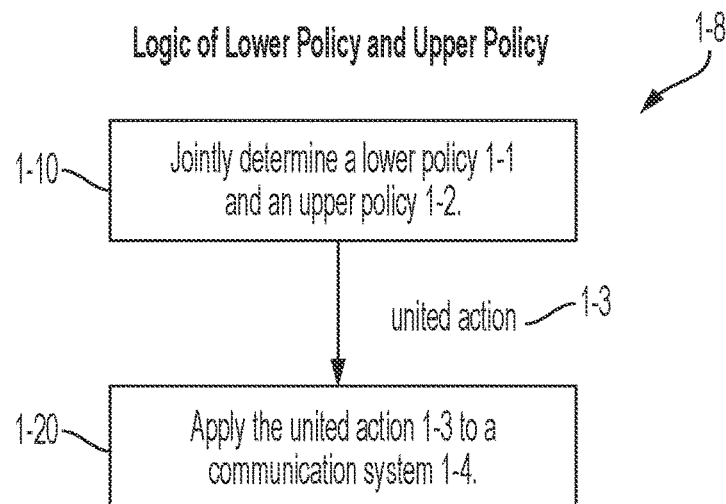
FIG. 1A illustrates a logic flow for jointly determining a first policy and a second policy and applying a united action to a communication network, according to some embodiments.

Cellular communications have penetrated to every corner of our daily lives. To support our ever-increasing communication demands, cells have been deployed across the territory to provide better services. However, due to regulatory and engineering constraints, cells cannot be deployed arbitrarily.

This leads to a mismatch between the relatively uniform distribution of cells and the uneven demographic distribution of people. As a result, a cellular system usually witnesses highly imbalanced loads across different cells, resulting in unsatisfied users and wasted resources.

Extensive efforts have been made to balance the load by migrating User Equipment (UEs) across cells. The existing Load Balancing (LB) methods can be divided into two categories, the Active-UE LB (AULB) and the Idle-UE LB (IULB). The AULB methods utilize the Handover (HO) mechanism to offload active mode UEs (i.e., UEs currently transceiving signals) from busy serving cells to less-busy neighboring cells. Such methods achieve instantaneous load balancing results, by paying the price of increased system overhead. The IULB methods leverage the Cell Re-selection (CR) mechanism to move idle mode UEs (i.e., UEs connected but not transceiving signals) from congested camping cells to other cells. These methods are more lightweight, since CR requires less system overhead than HO. Yet, the benefit is realized only after the migrated idle UEs become active.

The actions of AULB may conflict with the actions of IULB (and vice versa), resulting in unexpected degradation on system performance.

In order to improve system performance, embodiments provide a Hierarchical Policy Learning (HPL) method, which integrates both AULB and IULB into a two-level Reinforcement Learning (RL) structure. Concretely, the higher level adjusts AULB actions, and the lower level controls the IULB actions. The higher level aims to optimize the system performance directly as an RL reward, and at the same time, learns to set a goal for the lower level. Because this goal is particularly for the lower level and not the overall goal for the system, the goal for the lower level is a kind of subgoal.

The goal for the lower level is a desired RL state, which further improves the higher-level reward (and yet cannot be achieved with only higher-level actions). By approaching this goal, the lower level 1) indirectly enhances the system performance, and 2) is influenced to align with the higher level.

In this way, a collaboration is established between AULB and IULB, reducing or eliminating conflicts.

Embodiments provide HPL—the first hierarchical learning method that integrates different LB mechanisms (i.e., AULB and IULB) in a collaborative way.

Under different UE density settings, our HPL method always outperforms the SOTA methods. Specifically, compared to a direct combination of SOTA AULB and IULB, HPL improves the average throughput by up to 24%, while reducing the standard deviation of throughput by up to 31%.

The term "load" refer to the number of UEs being served. A BS is at a physical site, where radio access devices are placed. Consider a cellular network with NB BSs, each of which consists of NS non-overlapping sectors. A sector is serving the UEs located on a certain direction of its hosting BS. A sector supports NC carrier frequencies, each of which corresponds to a cell. A cell is a service entity serving the UEs within a certain direction of a BS and on a certain carrier frequency.

FIG. 1A illustrates logic flow 1-8. Logic flow 1-8 is a logic of a lower policy and a higher policy. At 1-10, the logic flow jointly determines a lower policy 1-1 and a higher policy 1-2. Based on the lower policy 1-1 and the higher policy 1-2, a united action 1-3 is provided to a communication system 1-4. At 1-20 the united action 1-3 is applied to the communication system 1-4.

Figure 1B:
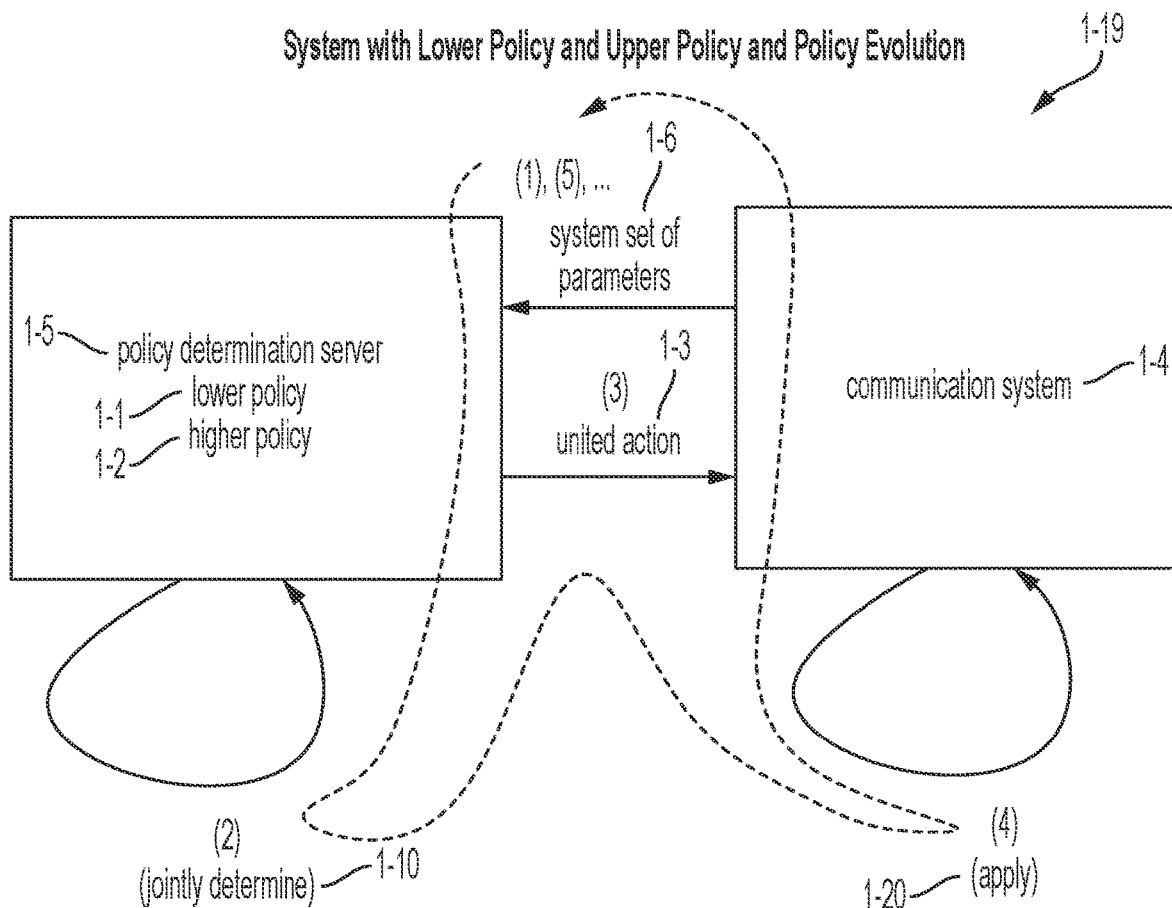
FIG. 1B illustrates a system 1-19 of a policy determination server determining for jointly determining a first policy and a second policy and applying a united action to a communication network, according to some embodiments.

FIG. 1B illustrates a system 1-19 and policy evolution. The system 1-19 is a system influenced by the lower policy 1-1 and the higher policy 1-2. The system includes a policy determination server 1-5 and the communication system 1-4. A series of time events is indexed with numbers in parentheses. All of the events (1), (2), (3) and (4) may be said to occur in one time epoch, and then similar events with different data occur in a next time epoch. An epoch may also be referred to as an iteration.

At (1), a system set of parameters 1-6 is provided from the communication system 1-4 to the policy determination server 1-5. At (2), the logic of 1-10 is performed and the lower policy 1-1 and the higher policy 1-2 are determined or evolved (revised or trained). At (3), the united action 1-3 is provided to the communication system 1-4. At (4), the logic 1-20 is performed and the united action 1-3 is applied to the communication system 1-4. Evolution then continues at (5) with an updated set of system parameters 1-6 provided to the policy determination server 1-5. As in the previous time epoch, the policy determination server 1-5 will then perform the logic 1-10, and so on.

Figure 1C:
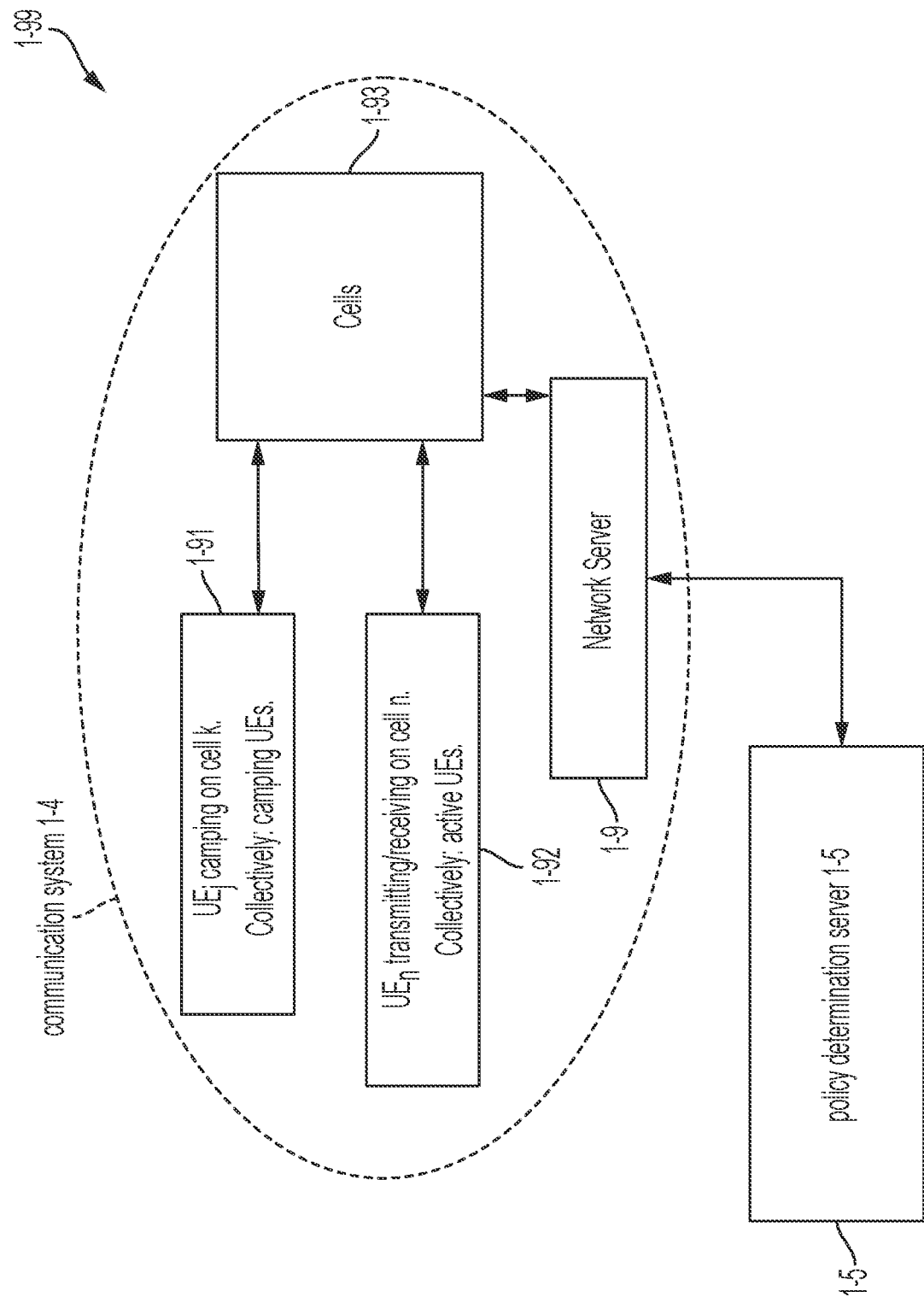
FIG. 1C illustrates a system 1-99 showing camping UEs 1-91, active UEs 1-92, being served by cells 1-93 being influenced, controlled or optimized by a policy determination server 1-9, according to some embodiments.

FIG. 1C illustrates a system 1-99 including further details with respect to FIGS. 1A and 1B of an exemplary communication system 1-4 being influenced, controlled or optimized by the policy determination server 1-5. FIG. 1C is a schematic representation showing camping UEs referred to as UEs 1-91 and active UEs referred to as UEs 1-92. The camping UEs 1-91 include a $UE_j$ camping on cell k. The active UEs 1-92 include a $UE_m$ transmitting and receiving user data on cell n.

Figure 1D:
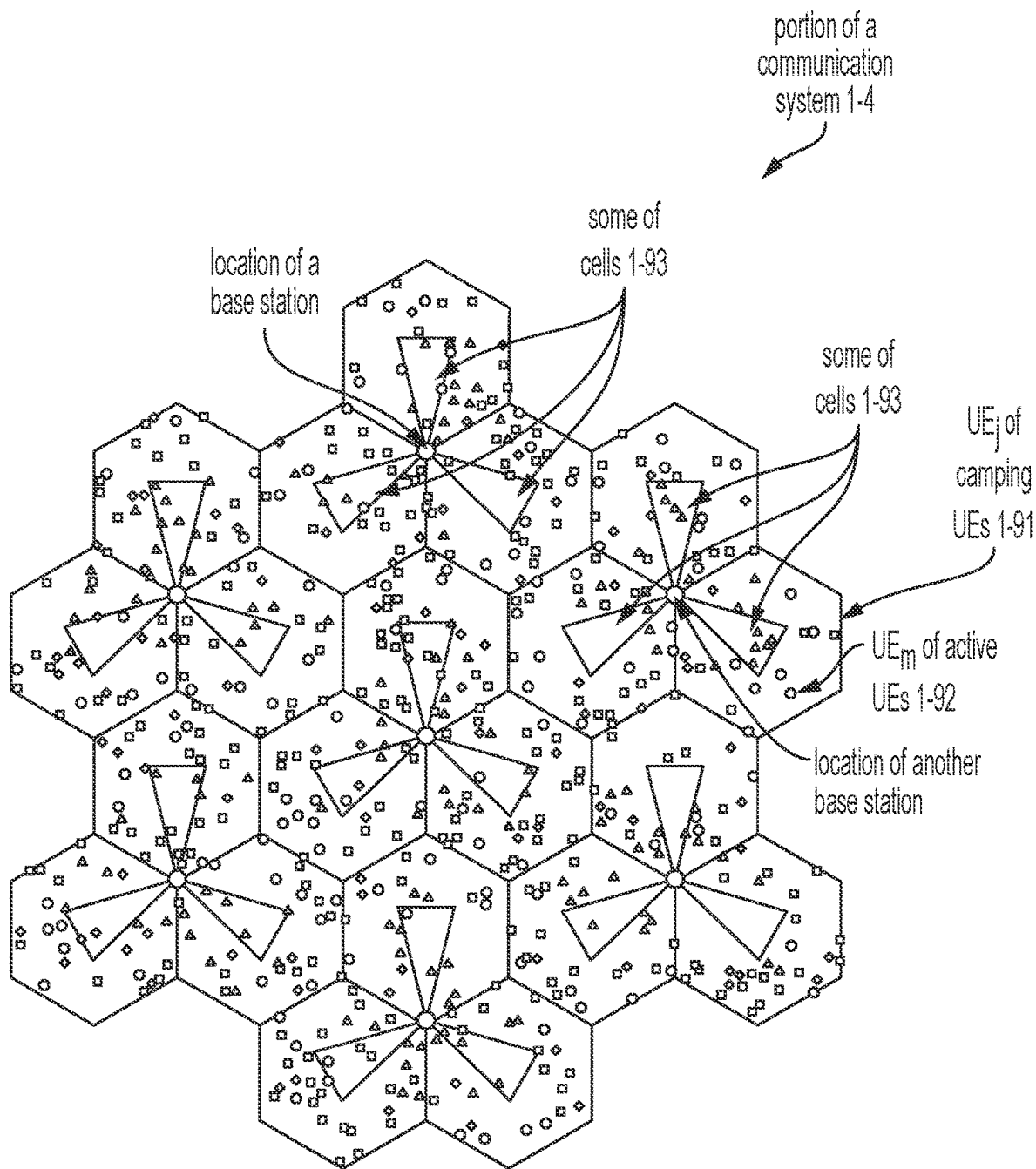
FIG. 1D illustrates an example communication system 1-4, according to some embodiments.

FIG. 1D illustrates an example portion of the communication system 1-4. In the Example of FIG. 1D, seven base stations support 21 illustrated cells. Each cell is a pie shape. FIG. 1D is schematic in nature, the cells in practice overlap geographically to provide overlapping coverage so that any UE can get service. Dots are shown indicating camping UEs 1-91 and active UEs 1-92. An example $UE_j$ of the camping UEs 1-91 is indicated. Also, an example $UE_m$ of the active UEs 1-92 is indicated.

Figure 2A:
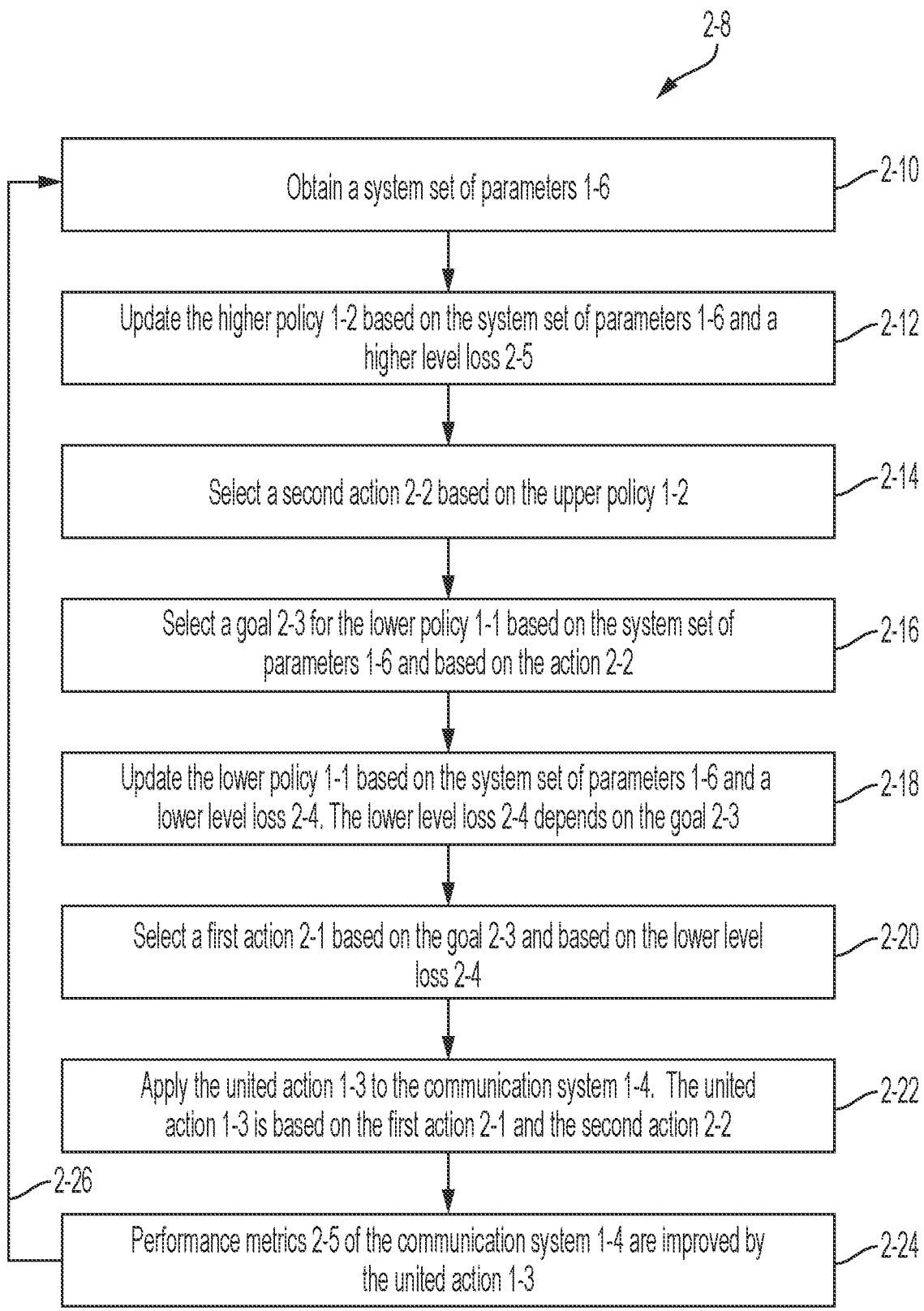
FIG. 2A illustrates a logic flow 2-8, according to some embodiments.

FIG. 2A provides logic 2-8 illustrating exemplary further logic details to realize the logic 1-8 of FIG. 1A. A summary of the logic 2-8 includes determining a system set of parameters; updating a higher policy based on the system set of parameters and higher loss; selecting a higher action based on the higher policy; selecting a goal for the lower policy based on the system set of parameters and the higher action; updating a lower policy based on the system set of parameters, goal, and lower loss; selecting a lower action based on the goal and lower policy; and applying a united action to the communication system. The united action is based on the lower action and the higher action.

The logic 2-8 is now discussed in detail. At 2-10, a system set parameters 1-6 is obtained. The system set may be an updated version as indicated at time (5) of FIG. 1B. The system set of parameters 1-6, as an example, includes the number of camping UEs in each cell, the number of active UEs in each cell, and real-time (or with low delay) statistics of user data throughput for each cell. Throughput statistics are used to estimate rewards for future actions. See line 5 of the pseudocode of FIG. 6B (discussed below).

Rewards may also be obtained at 2-10 of logic flow 2-8 (not shown). A lower level reward may be obtained using, for example, Eq. (10) (discussed below). A higher level reward may be obtained using the average throughput during a time T of Eq. (1) (discussed below).

At 2-12 the higher policy 1-2 is updated based on the system set of parameters 1-6 and a higher level loss 2-5. The higher policy may be trained, for example, using a gradient of a loss function defined for the higher policy. An example of a loss function for expressing the higher level loss 2-5 is provided by Eq. (12) (discussed below).

At 2-14, a second action 2-2 is selected based on the higher policy 1-2. The second action 2-2 is related to the active UEs 1-92.

Figure 2B:
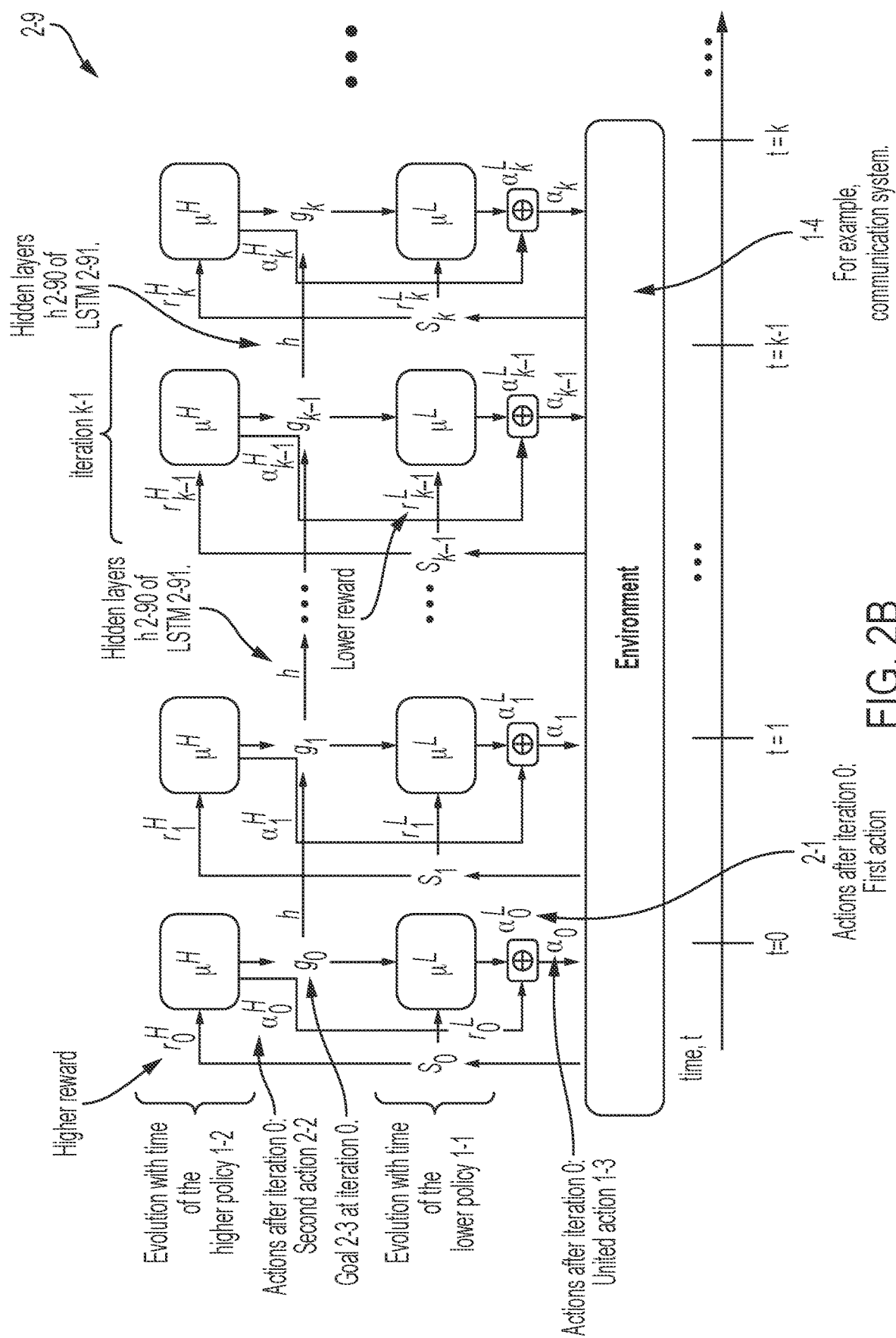
FIG. 2B illustrates an exemplary architecture 2-9 of hierarchical policy learning with communication system 1-4 as an example environment.

At 2-16, a goal 2-3 for the lower policy 1-1 is selected based on the system set of parameters 1-6 and based on the second action 2-2. A long short term memory (LSTM) neural network may be used, for example, to select the goal 2-3. An example of an LSTM 2-91 is indicated in FIG. 2B. Examples of goals indexed by time are given in FIG. 2B (see the variables $g_0, g_1, \ldots g_{k-1}, g_k, \ldots$).

At 2-18, the lower policy 1-1 is updated based on the system set of parameters 1-6 and a lower level loss 2-4. The lower level loss 2-4 depends on the goal 2-3. The lower policy 1-1 may be trained, for example, using a gradient of a loss function. An example of a loss function, for expressing the lower level loss 2-4, is given below in Eq. (11).

At 2-20 a first action 2-1 is selected based on the goal 2-3. The first action 2-1 is related to the camping UEs 1-92.

The first action 2-1 and the second action 2-2 are then combined as a united action 1-3, for example, by concatenation. Concatenation may be indicated algebraically by the symbol "$\oplus$". For a vector u=[a,b,c] and a vector v[d,e,f], u$\oplus$v=[a,b,c,d,e,f].

At 2-22 the united action 1-3 is applied to the communication system 1-4.

As a result of the united action 1-3, performance metrics 1-5 of the communication system 1-4 are improved (this is shown at 2-24). Example performance metrics are indicated in Eq. (1), Eq. (2), Eq. (3) (discussed below). An additional performance metric is a reduction in number of handovers per cell per unit time.

The logic then flows back as indicated by 2-26 to 2-10 for a next iteration or time epoch.

FIG. 2B illustrates evolution of the higher policy and the lower policy versus time. A time axis is shown at the bottom of FIG. 2B, with time advancing from left to right. Rewards which contribute to policy evolution are shown ($r^H$ and $r^L$). Actions $a^H$ of the higher policy are shown output by the higher policy at each moment in time (epoch, or iteration k). Actions $a^L$ of the lower policy are shown output by the lower policy at each moment in time. The actions are combined and then applied to the communication system 1-4, indicated in FIG. 2B as "environment." Goals are produced by LSTM 2-91 and hidden layers of the LSTM 2-91 are indicated as h. The hidden layers provide continuity between the goals as time advances. Further details of FIG. 2B are visited again with additional discussion below.

Figure 3:
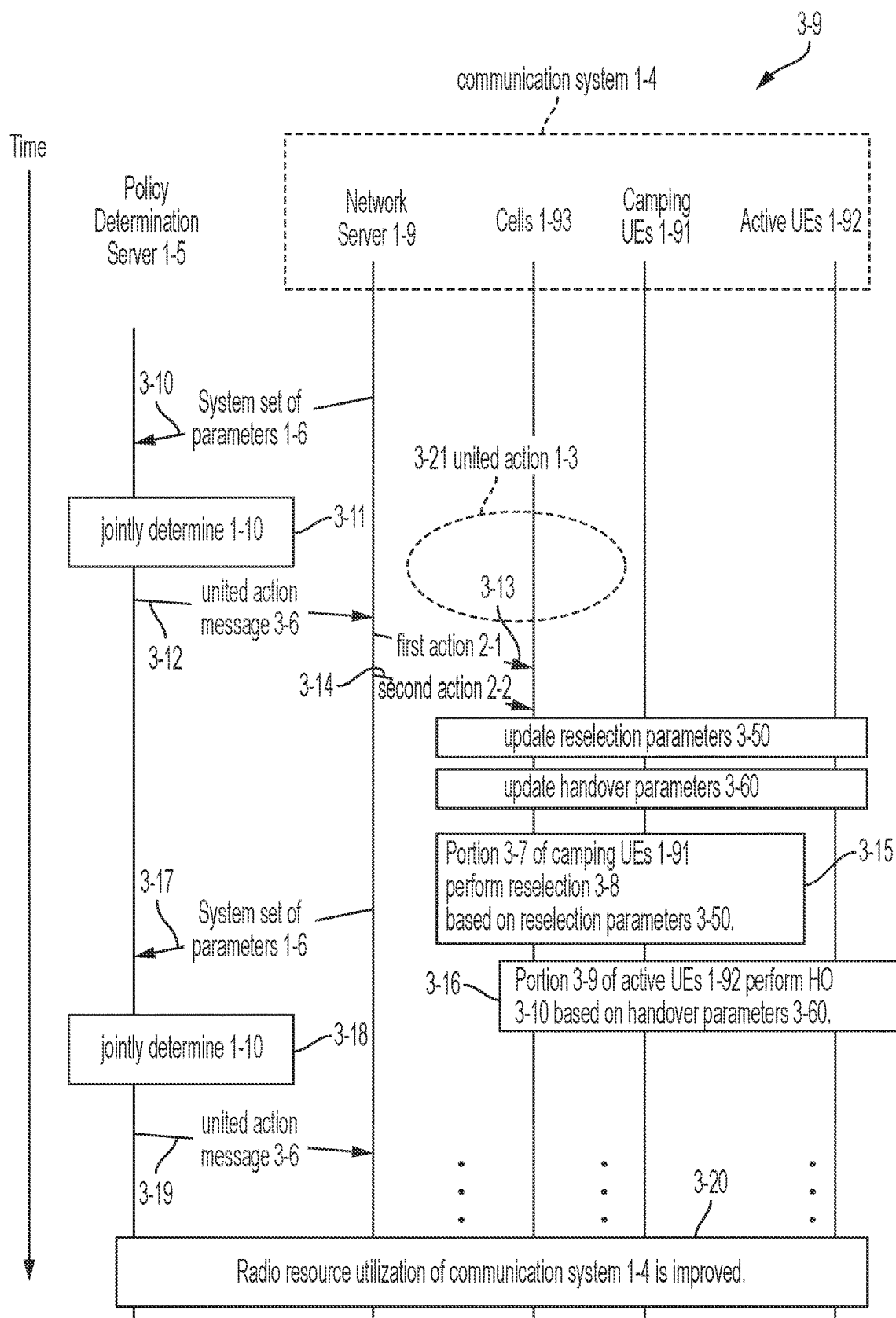
FIG. 3 illustrates a message bounce diagram 3-9, according to some embodiments.

FIG. 3 illustrates an exemplary bounce diagram 2-9 illustrating events of the policy determination server 1-5 and the communication system 1-4 of FIGS. 1B and 1C.

A time axis on the left side of FIG. 3 shows time advancing from top to bottom of the figure. Generally, the policy determination server 1-5 configures the network server 1-9. The network server 1-9 configures the cells 1-93. The camping UEs 1-91 and the active UEs 1-92 observer power levels and identities of the cells 1-93.

In FIG. 3, then, network server 1-9 provides a current version of the system set of parameters 1-6 to the policy determination server 1-5 in a message 3-10. This message 3-10 may pass over a network backhaul, which may be wired or wireless.

The policy determination server 1-5 then performs logic 1-10 to update the policies and generate the united action 1-3. The united action 1-3 is sent in a united action message 3-6 as event 3-12 to the network server 1-9.

The network server 1-9 then configures the cells 1-93. An exemplary overall configuration as indicated as 3-21 for this instance of united action 1-3. The united action 1-3 includes first action 2-1 (related to camping UEs 1-91) and second action 2-2 (related to active UEs 1-92).

The cells 1-93 then update reselection parameters 3-50 and the camping UEs 1-91 learn of the update (for example, through a conventional system information block (SIB), or the like). See Expressions (8) and (9) below for more details of example reselection parameters 3-50.

Similarly, the cells 1-93 then update handover parameters 3-60 and the active UEs 1-91 learn of the update (for example, through the conventional system information block (SIB), or the like). See Expression (4) below for more details of example handover parameters 3-60. In some embodiments, active UEs 1-91 obtain the handover parameter α from a SIB message transmitted by cells 1-93 (forwarded via server 1-5 and/or server 1-9) while they are active. Camping (for example, idle) UEs 1-91 obtain the cell-reselection parameters β and γ from a SIB message transmitted by cells 1-93 (forwarded via server 1-5 and/or server 1-9) while camping.

As shown by event 3-15 a portion 3-7 of camping UEs 1-91 perform reselection 3-8 based on the reselection parameters 3-50.

Also, at 3-16, a portion 3-9 of active UEs 1-92 perform handover 3-10 based on handover parameters 3-60.

The time axis is not to scale, and there may be various delays between configuring the cells, the UEs learning the updated parameters, the UEs observing power levels (RSRP, discussed below) and the UEs taking reselection or handover actions.

The system continues to evolve, and an updated system set of parameters 1-6 is received by the policy determination server 1-5 at 3-17. At 3-18 logic 1-10 is performed, and at 3-19, a united action message 3-6 for the next iteration is sent.

The processes continue to repeat as shown by the vertical ellipses ( . . . ) at the bottom of FIG. 3.

Based on the evolution of the policies and the actions taken, radio resource utilization of the communication system 1-4 is improved, shown as 3-20. This improvement occurs at each iteration, although 3-20 is shown as a single instance in FIG. 3.

Figure 4:
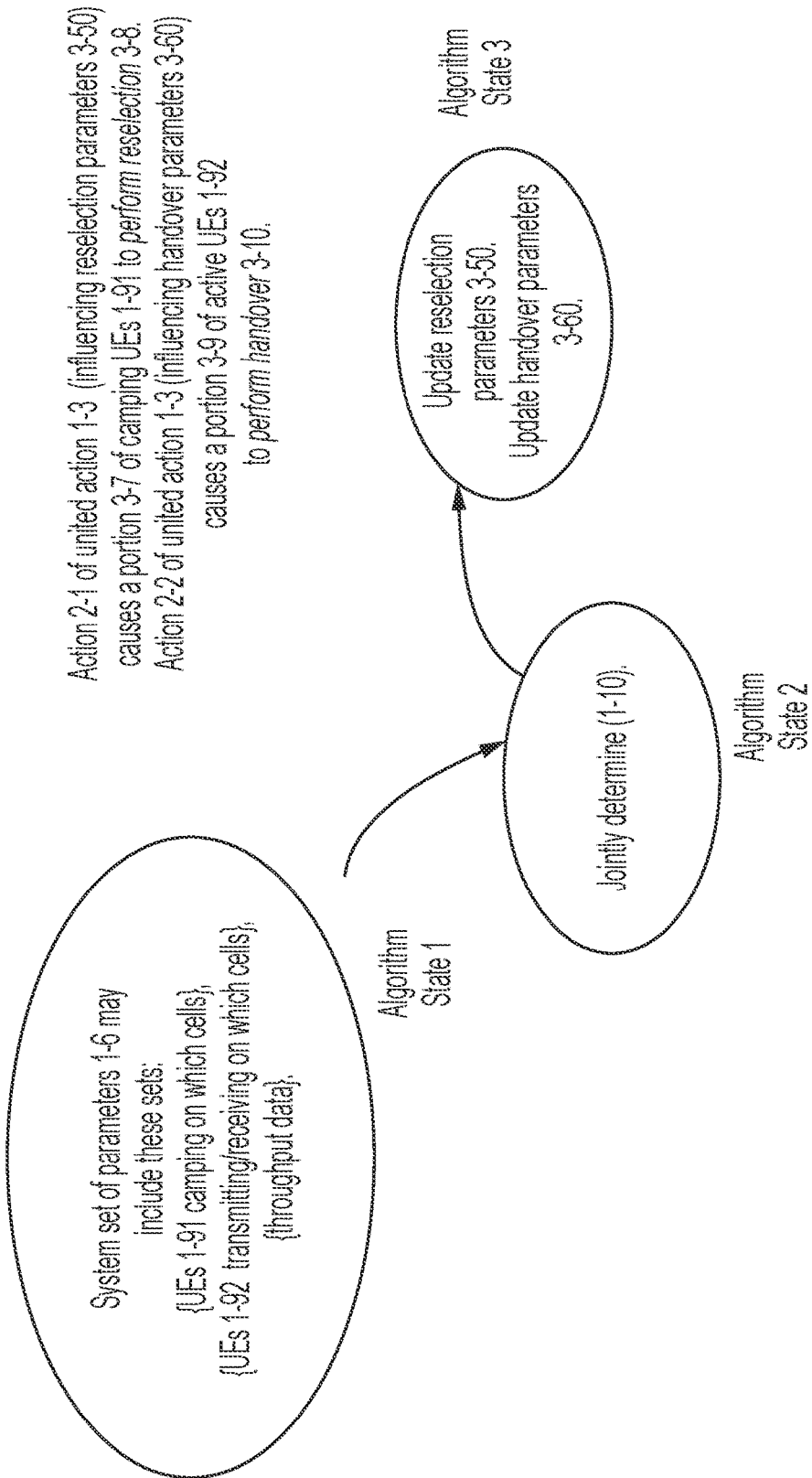
FIG. 4 illustrates an algorithm flow 4-1, according to some embodiments.

FIG. 4 illustrates algorithm flow 4-1, which is a general view of the evolution of FIG. 1B, the logic 2-8 of FIG. 2A and the bounce diagram of FIG. 3.

In FIG. 4, at algorithm state 1, the system set of parameters 1-6 is obtained. As an example, the system set of parameters 1-6 may include three sets: a set identifying the camping UEs 1-91 and which cell each UE is camping on, a set identifying the active UEs 1-92 and which cell each UE is transmitting/receiving on (this may be more than one cell simultaneously), and a set of throughput data indicting throughput estimates for each cell for a recent time period.

The algorithm then flows to algorithm state 2, and the logic of jointly determine 1-10 (see FIG. 1A, also see FIG. 2A items 2-12, 2-14, 2-16, 2-18, and 2-20) is performed.

The algorithm then flows to algorithm state 3 at which reselection parameters 3-50 and handover parameters 3-60 are updated in the communication system 1-4 by actions 2-1 and 2-2 (as a whole, united action 1-3).

Subsequent to algorithm state 3, action 2-1 is a cause of a portion 3-7 of camping UEs 1-91 to perform reselection, referred to collectively as reselection 3-8; also see FIG. 3 at 3-15. Also subsequent to algorithm state 3, action 2-2 is a cause of a portion 3-9 of active UEs 1-92 initiating handover, referred to collectively as handover 3-10; also see FIG. 3 at 3-16.

Figure 5:
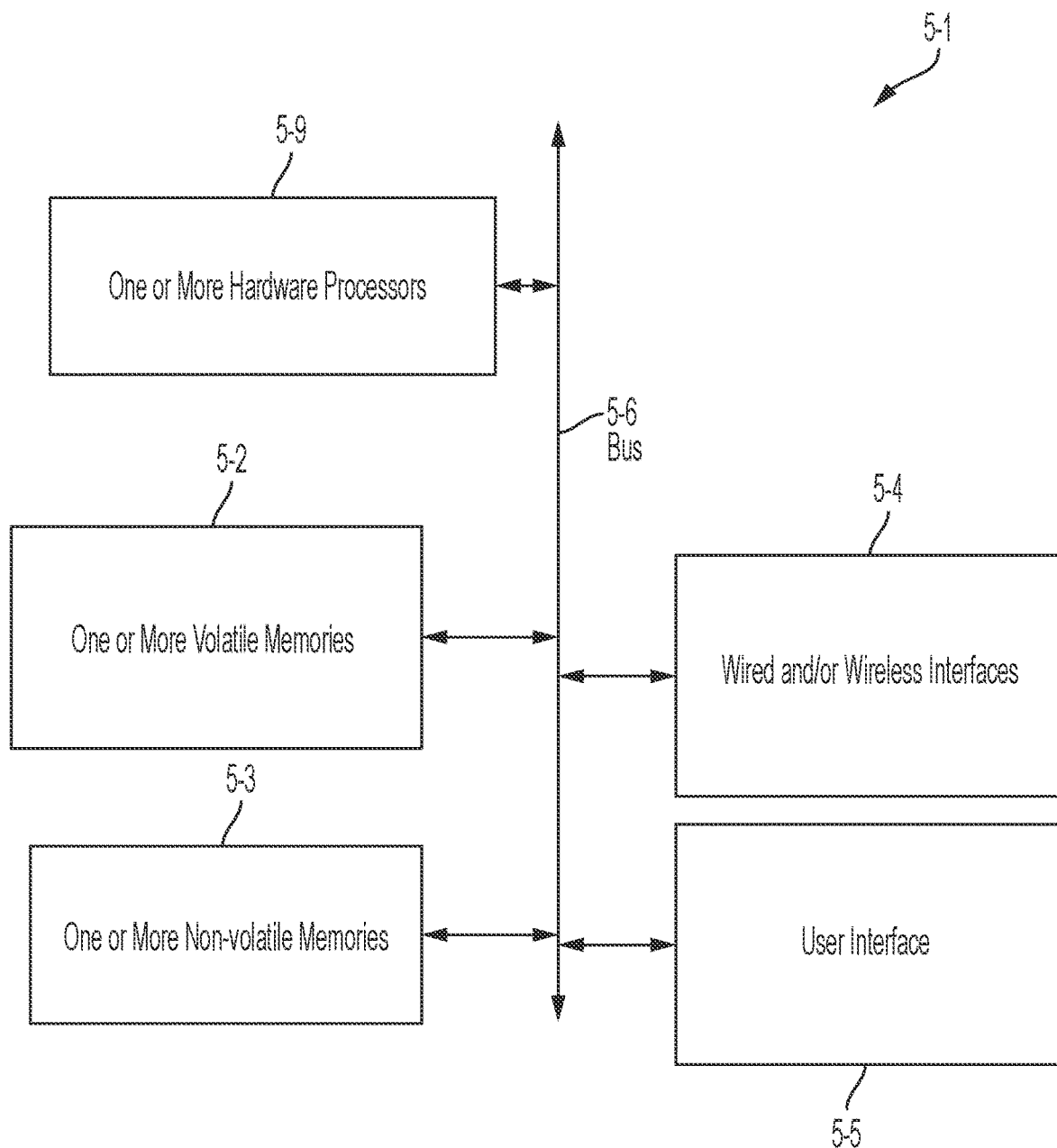
FIG. 5 illustrates an apparatus for implementing one or more of the embodiments, for example the policy determination server of FIG. 1B.

Hardware for performing embodiments provided herein is now described with respect to FIG. 5.

FIG. 5 illustrates an exemplary apparatus 5-1 for implementation of the embodiments disclosed herein. The apparatus 5-1 may be a server, a computer, a laptop computer, a handheld device, or a tablet computer device, for example. Apparatus 5-1 may include one or more hardware processors 5-9. The one or more hardware processors 5-9 may include an ASIC (application specific integrated circuit), CPU (for example CISC or RISC device), and/or custom hardware. Apparatus 5-1 also may include a user interface 5-5 (for example a display screen and/or keyboard and/or pointing device such as a mouse). Apparatus 5-1 may include one or more volatile memories 5-2 and one or more non-volatile memories 5-3. The one or more non-volatile memories 5-3 may include a non-transitory computer readable medium storing instructions for execution by the one or more hardware processors 5-1 to cause apparatus 5-1 to perform any of the methods of embodiments disclosed herein.

Figure 6A:
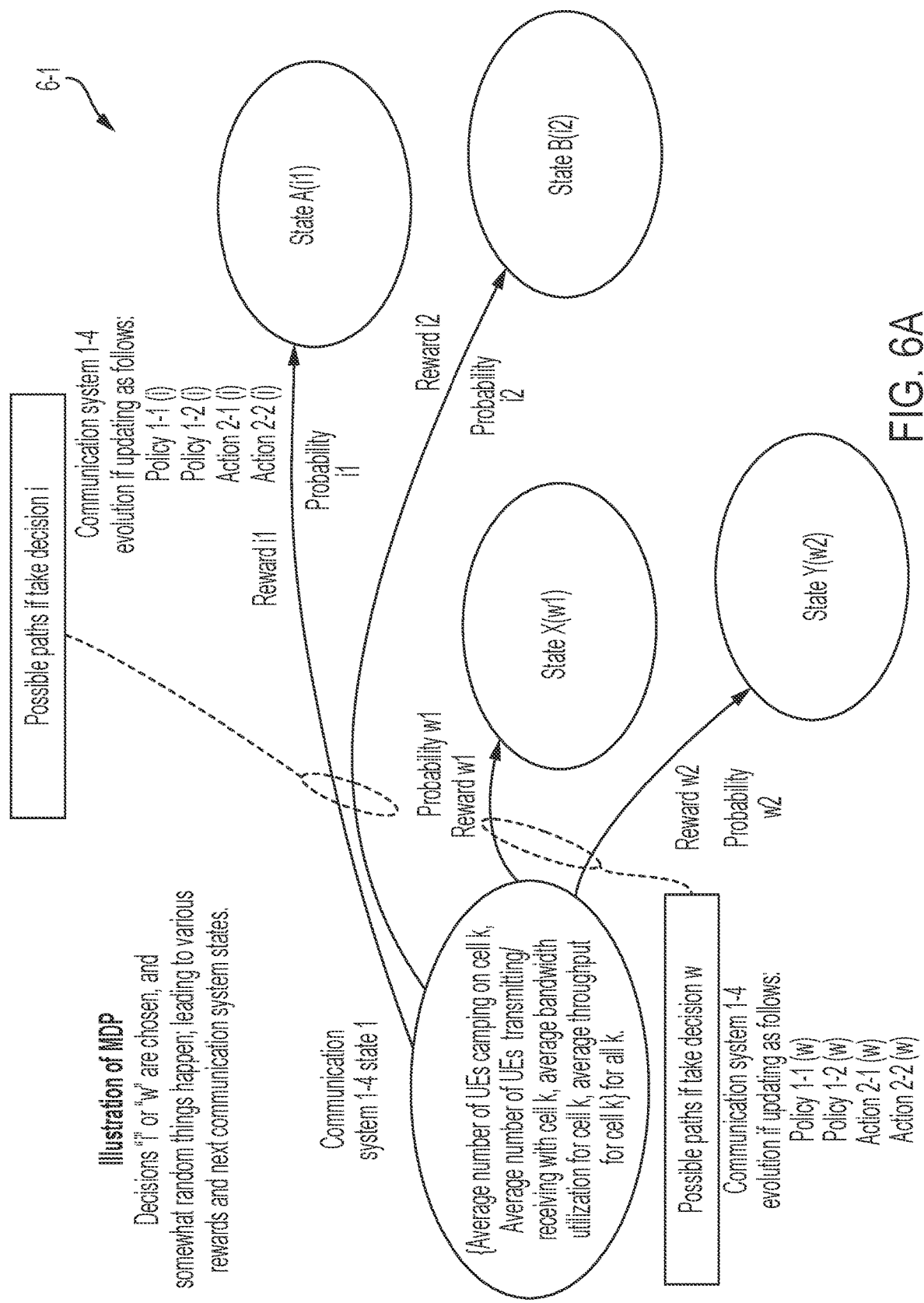
FIG. 6A illustrates a Markov Decision Process (MDP) 6-1, according to some embodiments.

FIG. 6A illustrates a conceptual decision point in the progress of an MDP. A first decision is called decision "i" in FIG. 6, and an alternative decision is called decision "w" in FIG. 6. The state is defined as a tuple (S; A; R; P) (discussed in further detail below).

Some attributes of a state, "communication system 1-4 state 1," are shown in FIG. 6. These attributes are average number of UEs camping on cell k, average number of active UEs transmitting/receiving with cell k, average bandwidth utilization.

As an example, four next states which may be reached from state 1 are shown. State A(i1) and State B(i2) may be reached by choosing decision i. States X(w1) and Y(w2) may be reached by choosing decision w. The Markov aspect is shown by the fact that taking decision does not always lead to a same successor state, rather there is a Probability i1 of arriving at A(i1) and a Probability i2 of arriving at B(i2). Similarly, following a choice of taking decision w, there is a Probability w1 of arriving at X(w1) and a Probability w2 of arriving at Y(w2). Similarly, there are four possible rewards, Reward i1, Reward i2, Reward w1 and Reward w2.

After taking decision i, policy 1-1, and 1-2 are updated according to the state arrived at and whatever the reward was. Similarly, after taking decision 2, policy 1-1 and 1-2 are updated according to the state arrived at and whatever the reward was.

In the specific example of application to communication system 1-4, the state is associated with how well the cells are working (throughput).

FIG. 6B illustrates pseudo code for an example embodiment. Line 3 corresponds to applying the united action 1-3 to the communication system 1-4.

Line 4 of FIG. 6B corresponds to obtaining the system set of parameters 1-6.

Line 5 refers to calculating rewards. Rewards are discussed below, for example see the discussion of Eq. (10) below for the lower-level reward and Eq. (1) below as an example of the higher-level reward.

Line 6 refers to advantage functions. An advantage function is a measure of how much is a certain action a good or bad decision given a certain state. The advantage function gives a measure of the advantage of selecting a certain action from a certain state.

Lines 7-9 refer to Eq. (11), Eq. (12) and Eq. (13) below.

At line 10, the action with the greatest reward as indicated by the higher-level policy is chosen.

At line 11, a subgoal generator (based on an LSTM) generates a new subgoal. A subgoal is also referred to as a goal herein.

At line 12, a lower level action is generated, based in part on the goal.

Line 13 represents formation of the united action 1-3 as a concatenation of actions from each policy.

Line 14 indicates returning to line 1 (this is similar to the loop back path 2-26 of FIG. 2A).

Figure 7A:
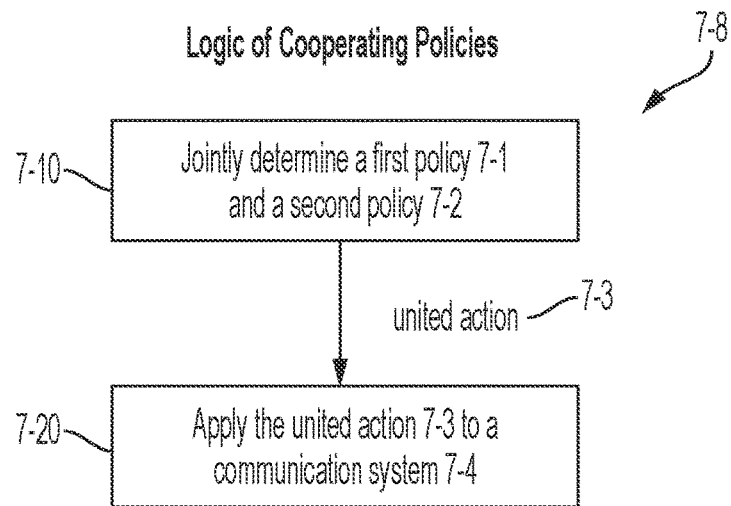
FIG. 7A illustrates basic logic of cooperating policies 7-8, according to some embodiments.
Figure 7B:
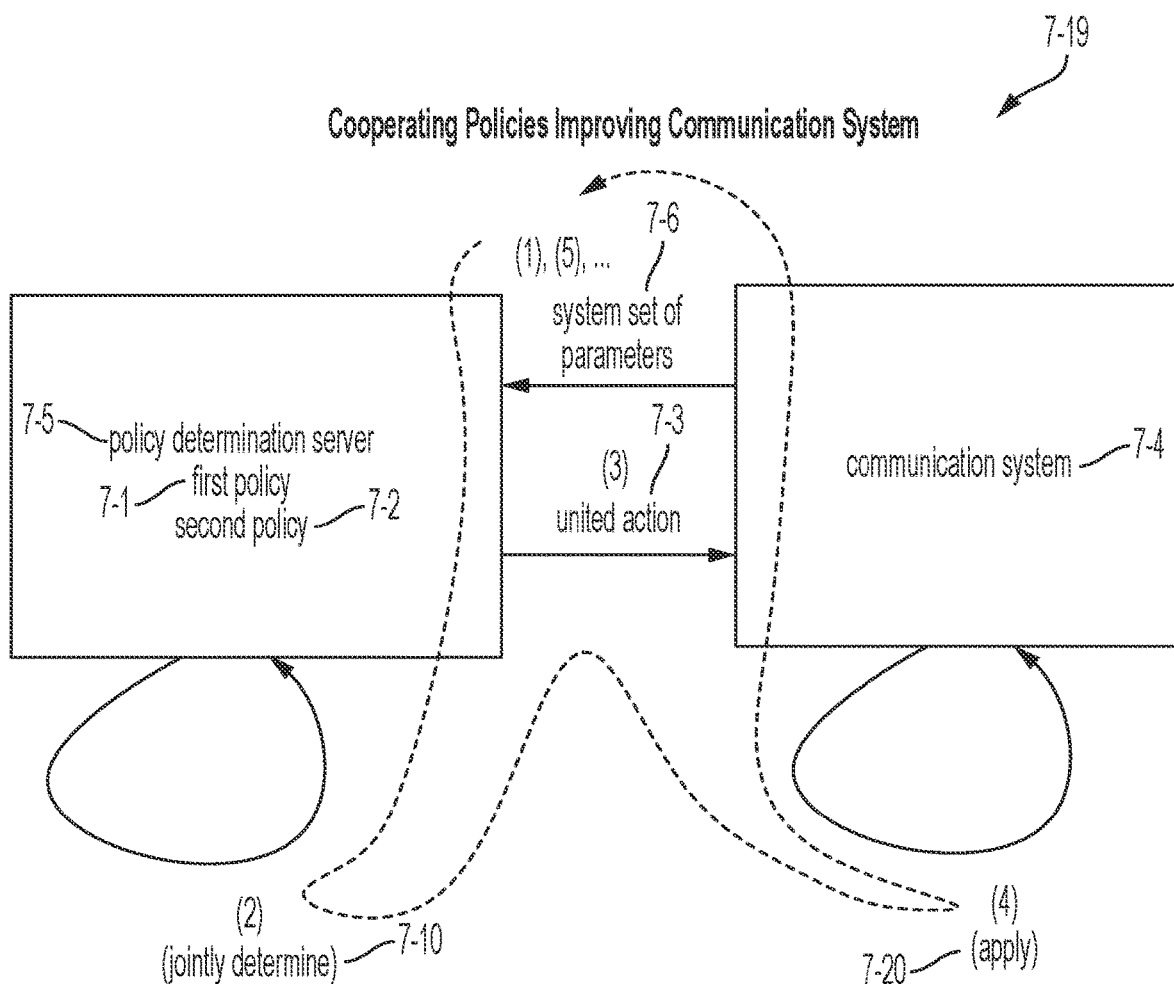
FIG. 7B illustrates a system 7-19 associated with the logic of FIG. 7A, according to some embodiments.

FIGS. 7A and 7B illustrates a breadth of application the hierarchical policy approach indicated by embodiments.

For example, the lower policy 1-1 is associated with moving towards a goal 2-3 associated with cell reselection, for example reselection 3-8 of FIG. 3 item 3-15.

However, embodiments do not limit the lower policy 1-1 to association with cell reselection.

For example, FIG. 7A illustrates logic flow 7-8. Logic flow 7-8 is a logic of a first policy and a second policy. At 7-10, the logic flow jointly determines a first policy 7-1 and a second policy 7-2. Based on the first policy 7-1 and the higher policy 7-2, a united action 7-3 is provided to a communication system 7-4. At 7-20 the united action 1-3 is applied to the communication system 1-4.

Further to FIG. 7A, FIG. 7B illustrates a system 7-19 and policy evolution. The system 7-19 is a system influenced by the first policy 7-1 and the second policy 7-2. The system includes a policy determination server 7-5 and the communication system 7-4. A series of time events is indexed with numbers in parentheses. All of the events (1), (2), (3) and (4) may be said to occur in one time epoch, and then similar events with different data occur in a next time epoch.

At (1), a system set of parameters 7-6 is provided from the communication system 7-4 to the policy determination server 7-5. At (2), the logic of 7-10 is performed and the lower policy 7-1 and the higher policy 7-2 are determined or evolved (revised or trained). At (3), the united action 7-3 is provided to the communication system 7-4. At (4), the logic 7-20 is performed and the united action 7-3 is applied to the communication system 7-4. Evolution then continues at (5) with an updated set of system parameters 7-6 provided to the policy determination server 7-5. As in the previous time epoch, the policy determination server 7-5 will then perform the logic 7-10, and so on.

Thus, the parameters 7-6, rewards, actions, communication system 7-4 are not limited to camping UEs 1-91. For example, the system set of parameters 7-6 of the logic 7-8 and system 7-19, in some embodiments are sensor data. The rewards of jointly determine 7-10 implementing Procedure 1 use metrics for system performance. Thus, Procedure 1 is not limited to the policy $\mu^L$ being directed to cell reselection of camping UEs. The actions forming united action 7-3 are, in some embodiments, controllable parameters that can be set either manually or automatically. The communication system 7-4, is in some embodiments, the communication system 1-4. A communication interface, for example between the policy determination server 1-5 of FIG. 1C and the network server 1-9 (also see messages 3-10 and 3-12 of FIG. 3) are adapted to transfer the system set of parameters 7-6 to the policy determination server 1-5 and the united action 7-3 to the network server 1-9 for further commands to the control agent.

In an additional embodiment, hierarchical policies of FIG. 1A are used to help servers save energy. In this case, the states of the MDP of FIG. 6A include cell PRB (Physical Resource Block) usage in addition to the previously-described state values (average UEs camping per cell, average active UEs per cell, bandwidth, throughput). The lower action in this embodiment is control of a radio on/off switch at the cell level (for each cell of cells 1-93 of FIG. 1C, turn off a radio device of a particular base station) and the higher action includes adjustment of a for active UE load balancing (UEs 1-92 of FIG. 1C). The reward at the higher level is the system energy metric in addition to original IP throughput metrics; both are observed directly in the environment. The lower-level reward evaluates whether the goal has been achieved, and is calculated with a reward function.

The following sections provide example details of example embodiments (see FIGS. 1A, 1B, 1C, 1D, 2A, 2B, 3, 4, 6A and 6B).

Suppose there are Nu UEs (camping UEs 1-91 and active UEs 1-92 taken together). An idle UE at the current moment may become active in the future, and vice versa.

A goal of embodiments is to balance the distribution of all UEs across different cells, so as to maximize the following metrics.

$$G_{aver} = \frac{1}{N_U} \sum_k \sum_i \frac{A_{i,k}}{T} \qquad \text{Eq. (1)}$$

where T is the time period of interest, and $A_{i,k}$ is the total size of packets received by $u_{i,k}$ within T.

The second metric is the minimum throughput $G_{min}$, i.e., $$G_{min} = \min_{i,k}\left(\frac{A_{i,k}}{T}\right) \qquad \text{Eq. (2)}$$

The third metric is standard deviation (SD) of throughput, $G_{sd}$.

$$G_{sd} = \sqrt{\frac{1}{N_U} \sum_k \sum_i \left(\frac{A_{i,k}}{T} - G_{aver}\right)^2} \qquad \text{Eq. (3)}$$

Minimizing $G_{sd}$ reduces a gap between the performance of different UEs and so provides more fair services across the UEs collectively.

Some LB methods rely on handover (HO) of active UEs. Regarding how reselection and handover occur, consider an example of a Reference Signal Received Power (RSRP1) based HO mechanism. A UE observes cell power; specifically, a UE compares an RSRP value of its serving cell against the values of its neighboring cells. If the following condition holds, then the active UE will be handed over to a neighboring cell, i.e., $$RSRP_j > RSRP_i + \alpha_{i,j} + H \qquad \text{Expression (4)}$$

where $RSRP_i$ represents the UE's RSRP from the serving cell i, $RSRP_j$ denotes the UE's RSRP from a neighboring cell j, $\alpha_{i,j}$ is the HO threshold from cell i to cell j, and H is the HO hysteresis. This HO threshold $\alpha_{i,j}$ is a pair-wise directional variable (e.g., $\alpha_{i,j} \neq \alpha_{j,i}$). By changing $\{\alpha_{i,j}\}$, embodiments adjust the HO boundaries between cells, and therefore balance the numbers of active UEs across cells.

Another category of LB methods depend on the Cell Reselection (CR) of idle UEs. When a UE is turned on, it first enters the idle mode and "camps" on a cell. An idle UE is ready to initiate a potential dedicated service or to receive a broadcast service. Once becoming active, the UE usually will stay in the same cell where it camped during the idle mode.

An idle UE can camp on another cell via the cell reselection (CR) procedure, so as to stay connected when moving. This CR procedure will be triggered, if the following condition holds for an idle UE:

$$RSRP_i < \beta_{i,j}, \text{ and } RSRP_j > \beta_{i,j} \qquad \text{Expression (5)}$$

where $\beta_{i,j}$ and $\gamma_{i,j}$ are pairwise and directional RSRP thresholds to trigger CR from a camping cell i to a neighboring cell j. The CR mechanism represented by the condition shown in Eq. (5) is a generalized one. By adjusting $\{\beta_{i,j}\}$ and $\{\beta_{i,j}\}$, embodiments achieve a balanced distribution of idle UEs across cells. This helps reduce the congestion when idle UEs become active.

Embodiments solve a hybrid LB problem, where both AULB and IULB are applied to achieve balanced load and better system performance. Embodiments define a hybrid LB problem as follows.

$$\max_{\{\alpha_{i,j}\},\{\beta_{i,j}\},\{\gamma\alpha_{i,j}\}} G \qquad \text{Expression (6)}$$

such that $\alpha_{i,j} \in [\alpha_{min}, \alpha_{max}]$ \qquad Expression (7)

$\beta_{i,j} \in [\beta_{min}, \beta_{max}]$ \qquad Expression (8)

$\gamma_{i,j} \in [\gamma_{min}, \gamma_{max}]$ \qquad Expression (9)

where G is the system performance, $\alpha_{min}$ and $\alpha_{max}$ define the controllable range of AULB actions, and $\beta_{min}$, $\beta_{max}$, $\gamma_{min}$ and $\gamma_{max}$ define the controllable range of IULB actions.

Although individual AULB and IULB provide some improvement to a network taken separately, it is non-trivial to fuse them together.

As an example of the difficulty, consider two co-located cells, cell 1 and cell 2 (same base station), residing on different carrier frequencies. As an example, an AULB method may set $\alpha_{1,2}=\alpha_{2,1}=2$ dB and H=1 dB, while an IULB method may set $\beta_{1,2}=-100$ dBm and $\gamma_{1,2}=-106$ dBm. A system may set $\gamma_{i,j} < \beta_{i,j}$ and $\gamma_{j,i} > \beta_{j,i}$ so that UEs can be balanced proportionally to the bandwidth (or other resources) of the cells.

In this example, an example UE is at first idle, and camps on cell 1 with $RSRP_1=-101$ dB and $RSRP_2=-105$ dB. The CR condition (Expression 5) is satisfied, i.e., $RSRP_1 < \beta_{1,2}$ and $RSRP_2 > \gamma_{1,2}$. Hence, this example UE re-selects cell 2 and camps on it. In an extension of the example, immediately after that, the example UE becomes active (transmitting and receiving user data), and uses cell 2 as its serving cell. As this moment, the example UE observes that the HO condition (Expression 4) from cell 2 to cell 1 holds as true, i.e., $RSRP_1 > RSRP2 + \alpha_{2,1} + H$. Consequently, the example UE is moved back to cell 1 via HO (handover). Generally, such quick UE oscillations ("ping-pong") among cells lead to degraded performance and wasted resources.

Embodiments provide a (deep) RL framework, which is effective and efficient for LB problems. The first step of applying RL is to formulate the hybrid LB problem as a MDP model as discussed above, for example FIG. 6A. An MDP model of e is defined as a tuple (S; A; P) as follows:

(i) S: is the state space. Every state is a continuous multidimensional variable, which contains the average number of active UEs in every cell, the bandwidth utilization of every cell, and the average throughput of every cell.

(ii) A: is the action space. Every action contains two parts. The first part $a^H$ corresponds to the HO parameters that control AULB actions (i.e., $\alpha_{i,j}$). The second part $a^L$ corresponds to the CR parameters that control IULB actions (i.e., $\beta_{i,j}$ and $\gamma_{i,j}$). In some embodiments, as an alternative, the second part $a^L$ is directed to turning on or off an aspect of a base station (for example, turn off a radio device of a particular base station such as a power supply, a power amplifier, a transmitter, and/or a receiver).

(iii) R: is the reward. Example embodiments use the throughput as the reward. Other rewards are possible. Any desirable system metric may be configured as the reward. In some embodiments, the higher-level reward depends at least in part on electrical power consumption of the cells 1-93.

(iv) P: is the transition probability function; see the example probabilities indicated in FIG. 6A.

To solve the lack of cooperation between AULB and IULB (for example, ping-ponging), embodiments provide a two-level hierarchical policy learning structure, which is shown in FIG. 2B. The higher level controls the AULB actions $a^H$ (actions 2-2) with policy $\mu^H$ (higher policy 1-2)

and the lower level controls the IULB actions $a^L$ (actions 2-1) with policy $\mu^L$ (lower policy 1-1). The actions $a^H$ and $a^L$ are fed into the cells 1-93 to adjust HO and CR parameters (described in detail below). The action 2-2 for the higher policy at time t may be denoted $\alpha_t^H$ or $a^H_t$. The resulting system performance is then collected to provide the updated RL reward.

At every time step t, both higher-level and lower-level policies receive a state $s_t$ from the environment. Based on this state, the higher-level policy $\mu^H(s_t)$ produces a higher level control action $a^H$ (action 2-2). This higher-level action is used in two ways. 1) it is fed to the system to for handover control, and 2) this higher-level action is also used to produce the goal 2-3 for the lower level. The goal is denoted as $g \in \mathbb{R}^d$, where d is the dimension of g. The goal $g_t \in \mathbb{R}^d$ (also denoted $g_t$) is calculated by the goal transition function $g_t = f(s_t, a_t^H)$. In other words, every time step, this function generates a goal according to the current state $s_t$ and higher-level action at time t: $a^H_t$. Embodiments utilize a LSTM network to implement a goal transition function, i.e., $g_t = \text{LSTM}(s_t, a_t^H)$. The use of LSTM makes sure that the current generated goal is consistent with the previous goals.

Based on the current state $s_t$ and the goal $g_t$, the lower level policy $\mu^L(s_t; g_t)$ produces an IULB action $a^L_t$. Since the goal embeds the higher-level actions, the lower-level policy is forced to be aligned with the higher-level policy when achieving this goal. The combined higher and lower actions, which may be represented as the concatenation $a^H_t \oplus a^L_t$, are applied to the system, so that the environment can return the next state $s_{t+1}$ and reward $r_t$.

The reward for each level is different. At time step t+1, the higher-level policy receives the reward $r_t$ directly from the environment, i.e., $r^H_t = r_t$, which measures the system performance. The lower-level reward $r^L_t$ evaluates whether the goal has been achieved, and is calculated with a reward function $r^L_t = \eta(g_t; s_{t+1})$.

A goal is defined as a goal state that is expected to provide larger higher-level reward than the current state. Usually, a goal state is not achievable with only the higher-level actions. Hence, the lower level comes in to play, such that the higher-level reward is further improved. Accordingly, embodiments define the lower-level reward function based on the distance between the current state and the goal state, i.e., $$r^L_t = \eta(g_t; s_{t+1}) = \|\emptyset(s_{t+1})\|_2 \qquad \text{Eq. (10)}$$

where $\emptyset(\cdot)$ is an embedding function to map the high dimensional space to low-dimensional space; embodiments use the low-dimensional Euclidean distance to describe how close two high-dimensional states are. The lower-level policy is rewarded for taking actions that yield states $S_{t+1}$ close to the desired goal $g_t$.

Both policies can be trained using advanced RL methods, by incorporating $g_t$ as an additional input into the value and policy functions. Some embodiments use an on-policy learning method Proximal Policy Optimization (PPO) as our policy training method, due to its robustness. PPO is a non-limiting example of a higher and lower policy learning algorithm. Other policy learning algorithms fit into the framework disclosed herein.

For example, the learning algorithm for both policies can be adopted from soft actor critic. Soft actor critic is an off-policy actor-critic deep RL algorithm based on the maximum entropy reinforcement learning framework. The actor aims to maximize expected reward while also maximizing entropy.

An additional technique which can be applied addresses function approximation error in actor-critic methods by a regularization strategy which includes target policy smoothing.

Given the lower-level reward in Eq. (10), the lower-level Q-value function is to minimize the loss:

$$L(\mu^L, D) = \mathbb{E}_{(s_t, a_t, g_t, s_{t+1}, a_{t+1}, g_{t+1}, r_t) \sim D}[Q\mu^L(s_t, a_t, g_t) - r(g_t, s_{t+1}) - \gamma Q\mu^L(s_{t+1}, a_{t+1}, g_{t+1})] \qquad \text{Eq. (11)}$$

Above, $Q\mu^L$ indicates the advantage value function of the lower level, and D is the replay buffer. The lower-level loss, Eq. 11, enforces that the learned actions should move the state close to the goal.

A replay buffer stores a number of most recently collected transitions and uses these to improve training. A replay buffer may be implemented as a circular buffer, where the oldest transition in the buffer is removed to make room for a transition that was just collected. Transitions are sampled from the replay buffer for use in training.

The higher-level reward function is shown in Eqn. (12). The learned policy aims to maximize the future collective rewards based on the current state. In other words, the higher-level policy generates a goal that is expected to improve the system performance (which is a major objective).

$$L(\mu^H, D) = \mathbb{E}_{(s_t, a_t, s_{t+1}, a_{t+1}, r_t) \sim D}[Q\mu^H(s_t, a_t) - r(s_{t+1}) - \gamma Q\mu^H(s_{t+1}, a_{t+1})] \qquad \text{Eq. (12)}$$

H Where $Q\mu^H$ is the advantage value function of the higher level.

Combining the proposed two policies, the learned actions for hybrid AULB and IULB work collaboratively in terms of improving the system performance without conflict with each other. The higher-level AULB policy takes the major step towards the optimal system performance by choosing it's own actions as well as setting the goal for the lower-level IULB policy. By fulfilling the goal, the lower-level policy helps further improve the system performance upon what has been achieved by the higher level.

Some Hierarchical RL (HRL) techniques use the higher-level policy to generate the goal directly. Different from them, embodiments employ a LSTM as our goal generator. The benefit for this design can be summarized as follows. First of all, LSTM can approximate a non-linear high-dimensional goal-transition function, which is not achievable with existing two-dimensional goal-transition function. Second, when generating the goals, it is important to maintain a certain level of consistency between the current goal and the previous ones. By using the LSTM model in embodiments, the hidden cell state computed in every time step will take the previous states into consideration and generate a consistent goal. See h in FIG. 2B.

The LSTM 2-91 is guided by training to generate $g_t$ that can further improve $r_t$. To this end, the training loss of this LSTM model is set as the opposite of advantage value function (note that the advantage value function captures the increment in the reward), i.e., $$L_{generator} = -Q\mu^L(s_t, a_t, g_t) \qquad \text{Eq. (13)}$$

By minimizing this loss ($L_{generator}$), the LSTM is trained to produce a goal state $g_t$ that can further improve $r_t$. This LSTM-based goal generator is trained together with control policies.

The entire HPL procedure is summarized as Procedure 1 in FIG. 6B.

The HPL procedure has been compared with other load balancing approaches and for different metrics.

The other load balancing approaches are:

AULB alone, IULB alone, sequential AULB then IULB, AULB and IULB together. The different metrics are standard deviation of throughput of Eq. (3), average throughput of Eq. (1), minimum throughput of Eq. (2), and number of handovers per cell per hour. The number of UEs per cell has been varied from 10 UEs to 30 UEs. The example communication system is shown in FIG. 1D.

Using HPL, the SD of throughput is reduced by 20 to 30% over the comparison approaches. The average throughput is increased by 0.3% to 24% over the comparison approaches. The minimum throughput is increased by 0.17% to 13%. The number of handovers is decreased by 2% to 9%.

What is claimed is:

1. A server method by a server for a hierarchical dual reinforcement learning process in a communication system, wherein the communication system includes a first base station and a second base station, the server method comprising:
updating a higher policy based on a system set of parameters and a second loss to improve a higher-level reward at a first time;
selecting a second action based on the higher policy;
selecting a goal for a lower policy based on the system set of parameters and based on the second action;
updating the lower policy based on the system set of parameters and based on a first loss to improve a lower-level reward at the first time;
selecting a first action based on the goal and based on the first loss; and
applying a united action to the communication system, wherein the united action is based on the first action and the second action.

2. The server method of claim 1, wherein the united action comprises the server configuring the first base station and the server configuring the second base station.

3. The server method of claim 1, wherein the second action is associated with active UE load balancing (AULB) and the first action is associated with inactive UE load balancing (IULB).

4. The server method of claim 1, wherein the updating the lower policy is a form of lower policy learning and the updating the higher policy is a form of higher policy learning.

5. The server method of claim 2, wherein the system set of parameters includes:
a first state of a first cell of the communication system, and
a first reward associated with the first cell, wherein the first base station supports the first cell.

6. The server method of claim 5, wherein the first state of the first cell is a first cell vector including at least three elements, a first element of the first cell vector is an average number of UEs in the first cell, a second element of the first cell vector is an average bandwidth utilization of the first cell, and a third element of the first cell vector is an average throughput of the first cell, and
wherein the server method further comprises determining the system set of parameters by receiving the first cell vector and receiving a second cell vector.

7. The server method of claim 4, wherein the lower policy is configured to identify lower-level actions associated with cell reselection at the first base station and at the second base station, and the higher policy is configured to identify higher-level actions associated with handover between the first base station and the second base station.

8. The server method of claim 7, wherein the lower-level actions include a first lower-level action of a first cell re-selection from a first cell to a second cell, and a second lower-level action of a second cell re-selection from the second cell to the first cell, and the higher-level actions include a first higher-level action of a first handover from the first cell to the second cell, and a second higher-level action of a second handover from the second cell to the first cell.

9. The server method of claim 8, wherein the first lower-level action is a first pair of thresholds, first beta and first alpha, and the first higher-level action is a first single threshold, first alpha, and the second lower-level action is a second pair of thresholds, second beta and second alpha, and the second higher-level action is a second single threshold, second alpha.

10. The server method of claim 1, wherein the selecting the united action is configured to improve a standard deviation of a throughput indicating fairness of the communication system, improve an average throughput of the communication system, and/or smooth ping-pong effects to moderate a number of handovers per cell per unit time.

11. The server method of claim 4, wherein the lower policy is configured to identify lower-level actions associated with a first radio on/off switch of a first radio device at the first base station and a second radio on/off switch of a second radio device at the second base station and the higher-level reward is based at least in part on a system energy metric related to electrical power saving.

12. A server comprising one or more processors and one or more memories, the one or more memories configured to hold instructions, wherein execution of the instructions by the one or more processors causes the server to perform:
update a higher policy based on a system set of parameters and a second loss to improve a higher-level reward at a first time;
select a second action based on the higher policy;
select a goal for a lower policy based on the system set of parameters and based on the second action;
update the lower policy based on the system set of parameters and based on a first loss to improve a lower-level reward at the first time;
select a first action based on the goal and based on the first loss; and
apply a united action to a communication system, wherein the united action is based on the first action and the second action.

13. The server of claim 12, wherein the server is configured to apply the united action by configuring a first base station and configuring a second base station.

14. The server of claim 12, wherein the second action is associated with active UE load balancing (AULB), and the first action is associated with inactive UE load balancing (IULB).

15. The server of claim 13, wherein the system set of parameters includes:
a first state of a first cell of the communication system, and
a first reward associated with the first cell, wherein the first base station supports the first cell.

16. The server of claim 15, wherein the first state of the first cell is a first cell vector including at least three elements, a first element of the first cell vector is an average number of UEs in the first cell, a second element of the first cell vector is an average bandwidth utilization of the first cell, and a third element of the first cell vector is an average throughput of the first cell, and wherein the server is further configured to obtain the system set of parameters by receiving the first cell vector, and the server receiving a second cell vector.

17. A non-transitory computer readable medium configured to hold instructions, wherein execution of the instructions is configured to cause a server to:
update a higher policy based on a system set of parameters and a second loss to improve a higher-level reward at a first time;
select a second action based on the higher policy;
select a goal for a lower policy based on the system set of parameters and based on the second action;
update the lower policy based on the system set of parameters and based on a first loss to improve a lower-level reward at the first time;
select a first action based on the goal and based on the first loss; and
apply a united action to a communication system, wherein the united action is based on the first action and the second action.

18. The non-transitory computer readable medium of claim 17, wherein the instructions are further configured to cause the server to apply the united action by configuring a first base station and configuring a second base station.

19. The non-transitory computer readable medium of claim 17, wherein the second action is associated with active UE load balancing (AULB), and the first action is associated with inactive UE load balancing (IULB).

20. The non-transitory computer readable medium of claim 17,
wherein the system set of parameters includes:
a first state of a first cell of the communication system, and
a first reward associated with the first cell, wherein a first base station supports the first cell,
wherein the first state of the first cell is a first cell vector including at least three elements, a first element of the first cell vector is an average number of UEs in the first cell, a second element of the first cell vector is an average bandwidth utilization of the first cell, and a third element of the first cell vector is an average throughput of the first cell, and
wherein the instructions are further configured to cause the server to obtain the system set of parameters by receiving the first cell vector and receiving a second cell vector.

* * * * *